United States Patent
Hitchcock

(10) Patent No.: US 6,487,558 B1
(45) Date of Patent: Nov. 26, 2002

(54) METHOD FOR GENERATING DATABASE SERVER CONFIGURATION DOCUMENTATION

(75) Inventor: Brian R. Hitchcock, Union City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 08/884,287

(22) Filed: Jun. 27, 1997

(51) Int. Cl.[7] .............................................. G06F 17/30
(52) U.S. Cl. ..................... 707/200; 707/204; 711/162
(58) Field of Search .............................. 707/200, 204, 707/205, 1, 202; 709/201, 220, 211; 711/161–162

(56) References Cited

U.S. PATENT DOCUMENTS

| | | | |
|---|---|---|---|
| 5,737,600 A | * 4/1998 | Geiner et al. | 707/200 |
| 5,740,431 A | * 4/1998 | Rail | 707/200 |
| 5,754,782 A | * 5/1998 | Massada | 707/4 |
| 5,771,354 A | * 6/1998 | Crawwford | 707/204 |
| 5,813,009 A | * 9/1998 | Johnson et al. | 707/100 |
| 5,822,780 A | * 10/1998 | Schutzman | 711/165 |
| 5,845,295 A | * 12/1998 | Houseman et al. | 707/204 |
| 5,850,507 A | * 12/1998 | Ngai et al. | 395/182.14 |
| 5,864,875 A | * 1/1999 | Van Huben et al. | 707/200 |
| 5,870,763 A | * 2/1999 | Lomet | 707/202 |
| 5,890,165 A | * 3/1999 | Boudrie et al. | 707/202 |

OTHER PUBLICATIONS

Microsoft Press Computer Dictionary, Kim Fryeer et al.; Microsoft Press, p. 32, 1987.*
Hitchcock, *Sybase Database Administrator's Handbook*, Prentice–Hall, Inc., 1996, chapter 8, pp. 275–328; chapter 15, pp. 513–556.
McGoveran et al., *A Guide to Sybase and SQL Server*, Addison–Wesley Publishing Company, Inc., 1992, pp. 306–332.

\* cited by examiner

*Primary Examiner*—Kim Vu
*Assistant Examiner*—Jean Bolte Fleurantin
(74) *Attorney, Agent, or Firm*—Blakely Sokoloff Taylor & Zafman LLP

(57) ABSTRACT

A method is provided to facilitate the re-creation of a destroyed database system by saving the database configuration data into a database configuration file. A human-readable database configuration file is created by retrieving configuration data from the system databases as well as the user databases. The database system can be configured so that periodically a procedure is automatically run to create the database configuration file. The procedure also creates scripts which can be executed to re-create a database.

30 Claims, 5 Drawing Sheets

METHOD FOR GENERATING DATABASE SERVER CONFIGURATION DOCUMENTATION

REFERENCE TO APPENDIX A

A portion of the disclosure of this patent document including Appendix A contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates generally to database management, and more specifically to methods for saving data needed to reconstruct a database management system.

BACKGROUND OF THE INVENTION

A database system has hardware elements and software elements. The software elements of the database system commonly include the operating system such as a UNIX operating system, a Windows NT operating system, or an OS/2 operating systems, the database management programs such as those provided by Informix, Oracle or Sybase, and the databases utilized by the database management programs. A conventional database system is schematically shown in FIG. 1.

The hardware elements commonly include the electronic computing devices and storage devices, such as hard disks or tape drives. Because of the usually large size of the software elements, the storage devices are normally large, having several hard disks linked together, for example. The databases are normally the largest in size among the software elements and commonly require the most storage space.

FIG. 1 shows one example of a conventional Sybase database system including a SQL server 102 that is installed on a database server computer 110. SQL server 102 is one specific example of a database server. A computer network 100 that interconnects database server computer 110, a plurality of workstations (not shown), and a database administrator workstation 107. Data administrator workstation 107 includes a local hard disk drive system 117 and a tape back-up system 109. Typically, data administrator workstation 107 is used to configure and control operation of SQL server 102.

SQL server 102 is typically a relational database management system. In a relational database management system, all the data are stored in tables, where each table represents an "entity" or a group of related information. Each row in a table represents information about an individual example of that entity.

SQL server 102 typically maintains information regarding the configuration and use of the relational database system, i.e., system information, in system tables within a master database 103. Master database 103 is one specific example of a system database in a more general database server. Master database 103 is dedicated to managing this system data. Master database 103 is completely independent of user databases 104, which contain information an individual user of the database normally accesses, and which can be created and managed within SQL server 102.

Within each user database, there are also system tables 105 that contain configuration data for that particular user database. Normally, user database system tables 105 contain user information such as access permission for the database objects.

The system tables in master database 103 store information regarding the users of SQL server 102, the users' account names and passwords, the size of each database, the size and location of disk space available to the databases, and the placement of the individual databases on individual disks, etc. The information stored in master database 103 is critically important. Without this information, one cannot restore the configuration of SQL server 102.

During normal operation, SQL server 102 automatically makes full and incremental backups of user databases 104 and master database 103. If there is a problem with a particular user database, the database administrator can reload the full and incremental backups of that user database, and SQL server 102 restores the data in the user database to the same state as when the last incremental dump was done.

Unfortunately, there are many situations in which simply reloading the backups, sometimes called dumps, is not sufficient to recreate the configuration of SQL server 102. Typically, the backups are stored in a proprietary format. In this situation, the backups are not useful unless the backup information can be loaded into a SQL server that is already properly configured.

In restructuring a server machine, e.g., adding additional physical disk capacity and moving logical volumes to the new physical disks, operating system 101 redefines the location of logical volumes, e.g., redefines the partitioning of the physical devices. In this situation, simply reloading database 103 restores the data in the system tables. Unfortunately, the data in the system tables now has no meaning because server machine 110 now has new disks and new disk partitioning, which is different from that in master database 103. A similar problem occurs in transporting SQL server to a new server machine.

In case of a disk failure or a corrupted backup tape, master database 103 may be lost. If there is a tape backup, it is typically unusable given the priority nature of the format. In this case, the ability to reload master database 103 is lost. This effectively wipes out SQL server 102. To assure restoration of an SQL server under all failure scenarios a new backup methodology is required.

SUMMARY OF THE INVENTION

A database configuration data backup computer process automatically backs up database configuration data in a database management system recovery file that is easily read by a database administrator. The database configuration information stored in the computer file is sufficient to permit the database administer to reconstruct the complete database management system including all system databases and all user databases.

Therefore, if the original database management system is corrupted, or if the original database management system is damaged, it is no longer necessary to have a working database server to read the backup data. Rather, the database administrator, using the database configuration file of this invention can restore the database management system. The database management system recovery output file is human readable which means that the data in the file is stored in a format, typically a text format such as the ASCII format, that can be displayed easily on a computer system. Since the data is not in a proprietary format that can be processed only by a working database management system server, the fact that there is not a working database management system server is of no consequence.

In one embodiment, a computer operating system includes a mechanism for executing a process at a scheduled time and this mechanism initiates the execution of database configuration data backup process of this invention. The process dumps the system configuration data, e.g., data in system tables of a system database, to the human readable database management system recovery output file. For example, an identification of a database server followed by the overall configuration of the database server is written to human readable database management system recovery output file. This information includes a complete map of the storage space used by database server as well as the storage space available to database server.

To obtain the configuration information for each user database in the database server, the user databases must be identified. Hence, the process of this invention accesses the system database and obtains the name of each user database. A list of user database names is written to human readable database management system recovery output file.

For each user database in the list, the configuration data from the user database is written to the human readable database management system recovery output file. The configuration data for the user database includes the database name, the user account names, the access codes, etc.

When the configuration information for each user database in the database list is written to the human readable database management system recovery output file, the file is sent via electronic mail to a designated location or locations.

The process of this invention takes information in a first form, i.e., data in the system and user databases, and converts the information to a second form, data written in a standard format, that is stored in a computer file that is easily read by a human. This conversion provides a new level in capability in restoring database management systems.

DETAILED DESCRIPTION

Figure 1:
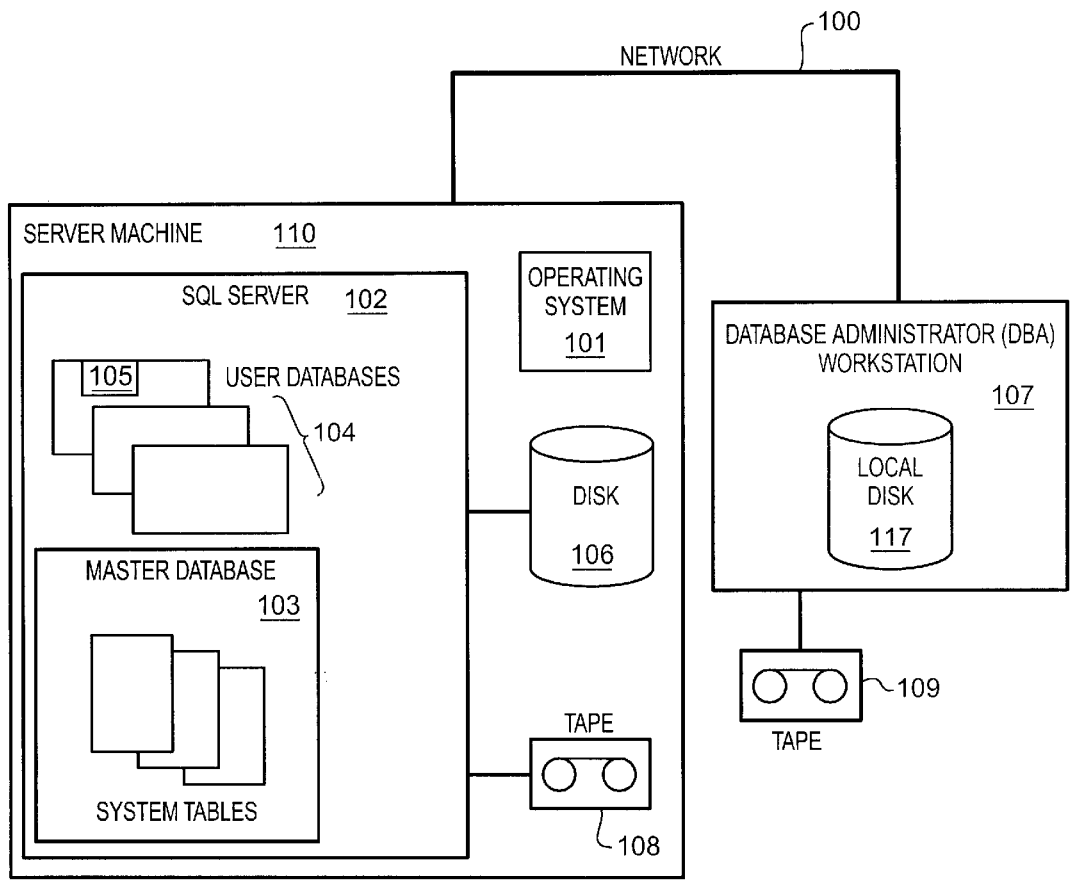
FIG. 1 is a schematic diagram of a conventional database system.
Figure 2:
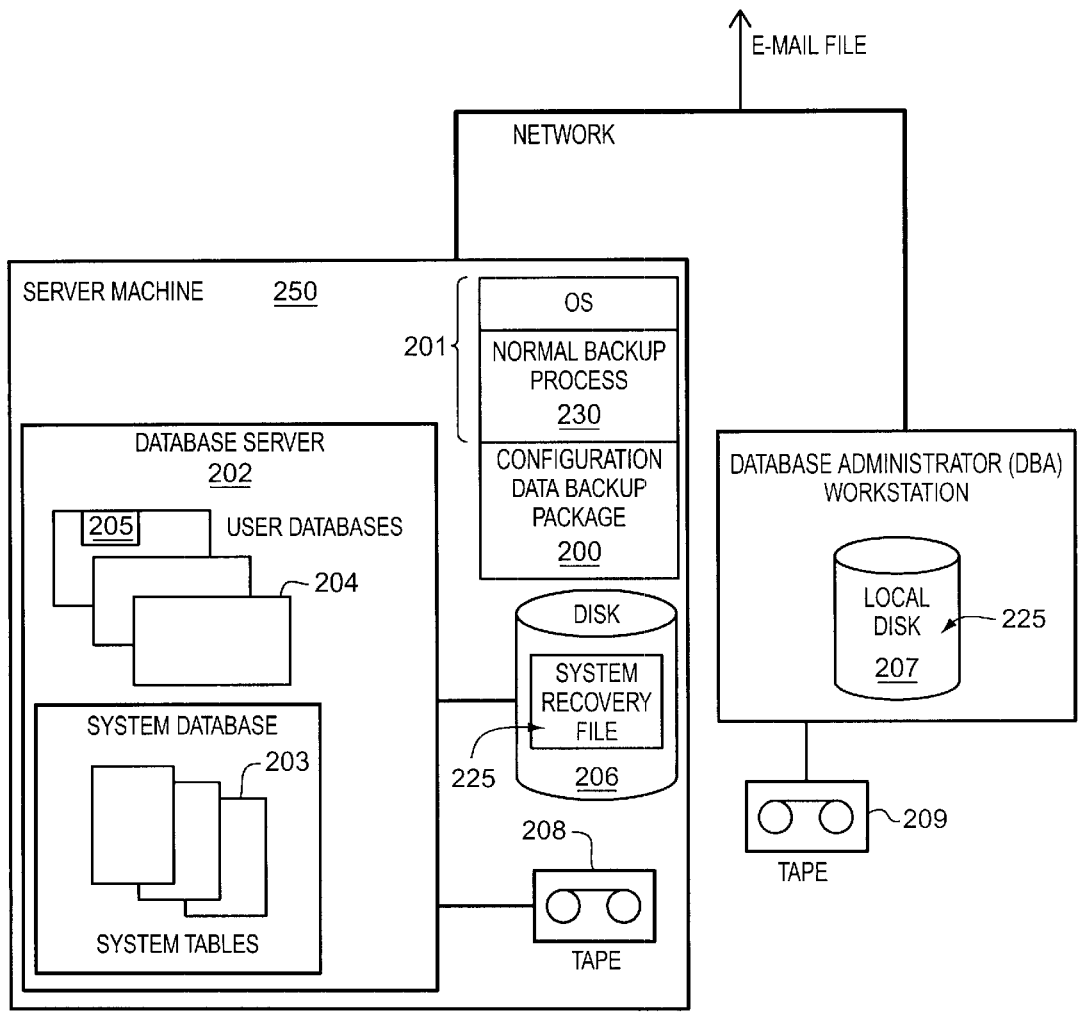
FIG. 2 is a schematic diagram of a database system according to the present invention.
Figure 3:
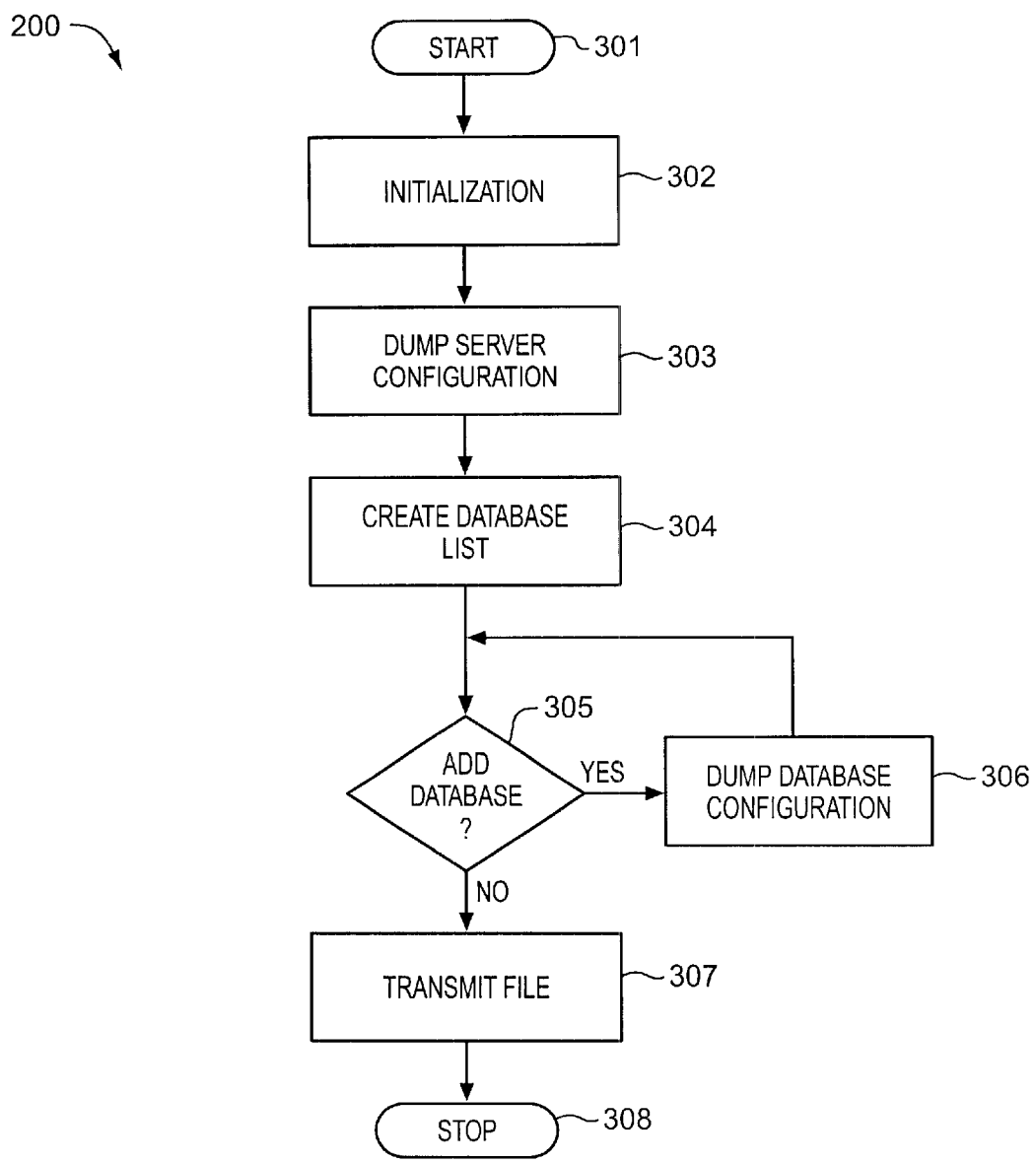
FIG. 3 is a flow diagram of a process for creating a database management system recovery output file.

According to the principles of this invention, as shown in FIGS. 2 and 3, a database configuration data backup process 200 for a database management system, e.g., a database server 202, on a server computer 250 copies each of the system tables in system database 203, and any system information 205 in each of user databases 204 to a human readable database management system recovery output file 225 on disk system 206. When normal backup process 230 is executed on server computer 250, the normal backup process copies human readable database management system recovery output file 225 on disk system 206 to tape backup unit 208 along with the other files that constitute database server 202.

Human readable database management system recovery output file 225 includes all the configuration information about database server 202 in a text format. The configuration information includes all information regarding database server 202, all information regarding the databases in database server 202, and the user of each database. Thus the configuration information includes the distribution of the databases on different disks and the disk partitions, i.e., the maps that define the storage locations of the information used by database server 202.

In addition to generating human readable database management system recovery output file 225, database configuration data backup process 200 of this invention automatically sends file 225 to one or more designated locations that can include a remote archive location.

Hence, if either disk system 206 of server computer 250, or the site containing server computer 250 is destroyed, human readable database management system recovery output file 225 can be retrieved from a tape backup or retrieved from one of the designated locations that received file 225. The combination of the normal tape backup files and human readable database management system recovery output file 225 can be used to completely reconstruct the original database management system, e.g., database server 202, as it existed at the time backup process 200 was executed.

Herein, a human-readable computer file does not mean that the file itself can be read by a human, but rather that the information is written in the computer file in a standard format that can be processed and displayed by a computer without utilizing special software. Hence, any computer system can be used to display the contents of human readable database management system recovery output file 225, e.g., to copy the computer file to a printer or to a display device, since computer file 225 is in a standard format, such as the ASCII format, that can be processed by most computer systems.

To recreate original database server 202 on a new computer, or with a new disk, or disk system, the database administrator can now read the configuration data in the system database tables that defined the storage locations of the information utilized by database server 202 from file 225. The database administrator loads the normal backup data on the new computer, disk, or disk system. The database administrator using the configuration information in file 225 simply edits the system database tables to reflect the configuration of the new computer system, disk, or disk system. Therefore, database server 202 can locate all the original information on the new system. The normal database dumps can now be loaded to recreate the data in the user database.

FIG. 3 is a process flow diagram for one embodiment of database configuration data backup process 200 in accordance with the present invention. Typically, a computer operating system 201 includes a mechanism for executing a process at a scheduled time. Thus, process 200 enters start operation 301 upon computer operating system initiating execution of database configuration data backup process 200, which is a computer process.

Operation 301 immediately transfers processing to initialization operation 302. In initialization operation 302, database server 202 is accessed. This typically requires identifying database server 202 and supplying any information such as a password that is required to gain access to all the information in database server 202. Also, the location of human readable database management system recovery output file 225 on disk system 206 is defined. Upon completion of initialization operation 302, processing transfers to dump server configuration operation 303.

Dump server configuration operation 303 first writes an identification of database server 202, the date and the time to human readable database management system recovery output file 225. Next, dump server configuration operation 303 reads the overall configuration from database server 202 and writes the overall configuration of database server 202 to human readable database management system recovery output file 225. This information includes a complete map of the storage space used by database server 202 as well as the storage space available to database server 202. Dump server configuration operation 303 manipulates data used internally by database server 202 as needed to generate human readable data that can be interpreted by the database administrator. For example, logical pages are translated to Megabytes of storage.

Herein, data are described as-being written directly to file 225. This is illustrative only and is not intended to limit the invention to this particular sequence of operations. Those of skill in the art understand that data can be stored in memory and the stored data subsequently moved to output file 225. The important aspect is that ultimately the configuration data is saved in output file 225. After the overall server configuration is written to human readable database management system recovery output file 225, dump server configuration operation 303 transfers to create database list operation 304.

To obtain the configuration information for each user database in database server 202, the user databases must be identified. Hence, create database list operation 304 accesses system database 203 and obtains the name of each user database. Create database list operation 304 saves the names in a database list that is ordered by name. Operation 304 writes the database list of names to human readable database management system recovery output file 225. Finally, operation 304 removes any extraneous information in the database list so that the database list can be used in the subsequent processing. Operation 304 transfers processing to additional database check operation 305.

Additional database check operation 305 determines whether all of the databases in the database list generated in operation 304 have been processed. If there is at least one database left in the list, processing transfers from check operation 305 to dump database configuration operation 306 and otherwise to transmit file operation 307. In transferring to operation 306, the current database in the list is identified.

Dump database configuration operation 306 reads the configuration data from the current user database and writes that configuration data in human readable database management system recovery output file 225. The configuration data for the user database includes the database name, the user account names, etc. Upon completion of dump database configuration operation 306 for the current user database, processing returns to additional database check operation 305.

When the configuration information for each user database in the database list is written to human readable database management system recovery output file 225, check operation 305 transfers to transmit file operation 307. Transmit files operation 307 writes a completion marker in human readable database management system recovery output file 225 and if necessary, closes human readable database management system recovery output file 225. Transmit file operation 307 then sends file 225 via electronic mail to a designated location or locations. Upon completion of operation 307, database configuration data backup process 200 is complete and so processing transfers to stop operation 308.

In one embodiment, prior to stop operation 308, process 200 calls the standard system backup procedure in the operating system. The standard system backup procedure copies all the files on server computer 250 including human readable database management system recovery output file 225 to backup tape system 205 and optionally to database administrator backup tape system 209.

Hence, database configuration data backup process 200 of the present invention automatically dumps all the necessary configuration data from the system tables in the system database and the user databases to a human-readable configuration backup file, i.e, human readable database management system recovery output file 225. The human-readable configuration backup file is sent through e-mail to any desired site that has an e-mail address including remote sites for archiving.

In one embodiment, database configuration data backup process 200 is implemented on a Sun Microsystems SparcServer 20 server computer with a UNIX operating system such as the Solaris operating system available from Sun Microsystems of Palo Alto, Calif. In this embodiment database server 202 is the Sybase System 11 database management system available from Sybase Inc. of Emeryville, Calif. Process 200 is a Bourne shell script that is initiated using the UNIX cron utility.

Figure 4:
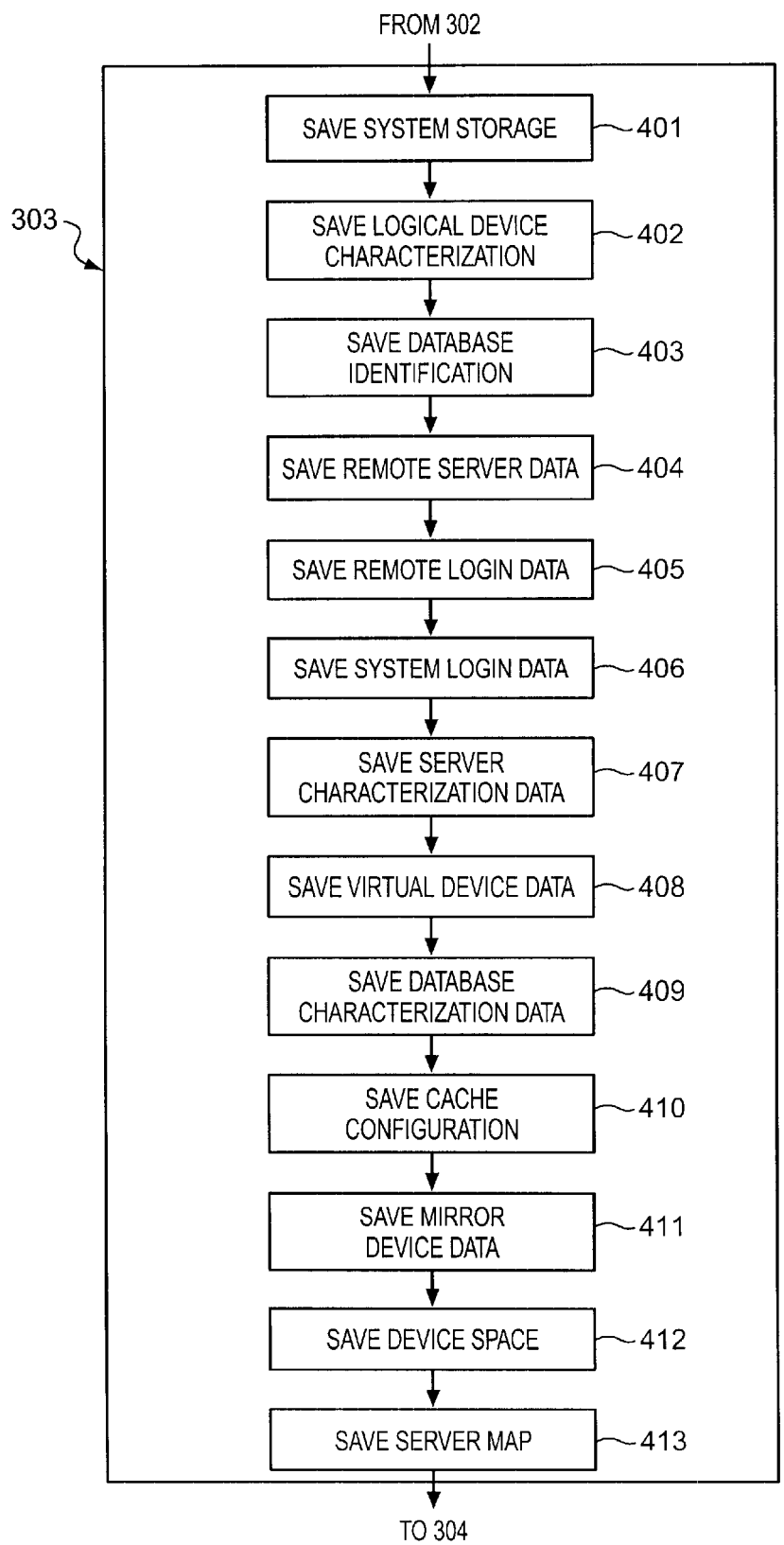
FIG. 4 is a flow diagram of a process for retrieving database server configuration data.

FIG. 4 is a more detailed process flow diagram for one embodiment of dump server configuration operation 303. Save system usage operation 401 retrieves information from system database 203 about the size and location of each allocation of disk space used by database server 202 on disk system 206. Save system storage operation 401 writes a row of information characterizing each chunk of disk space used by database server 202 in human readable database management system recovery output file 225, and writes a separate row of information characterizing each chunk of disk space allocated to database server 202. For a Sybase SQL server, the command used to perform operation 401 is select * from sysusages from the master database. Save system storage operation 401 transfers processing to save logical device characterization operation 402.

Save logic device characterization operation 402 retrieves the names and configuration of the logical devices from system database 203. Logical devices are used in a database system so that several chunks of disk space are known to database server 202 by a single logical device name. Save logic device characterization operation 402 writes the names and configuration of the logical devices to human readable database management system recovery output file 225. For a Sybase SQL server, the command used to perform operation 402 is select * from sysdevices. Save logical device characterization operation 402 transfers processing to save database identification operation 403.

Save database identification operation 403 retrieves the name, identification and creation date of each database in database server 202 from system database 203. The name, identification and creation date of each database in database server 202 are written to human readable database management system recovery output file 225. Information from save database identification operation 403 taken together with the system usage information from save system storage operation 401 permits determination of which chunk or chunks of disk space belong to which database, and on which physical device the chunks are located. For a Sybase SQL server, the command used to perform operation 403 is select * from sysdatabases. Save database identification operation 403 transfers processing to save remote server data operation 404.

Save remote server data operation 404 retrieves the configuration of remote servers known to database server 202 from system database 203. The configuration of remote servers known to database server 202 are written to human readable database management system recovery output file 225. For a Sybase SQL server, the command used to perform operation 404 is select * from sysservers. Save remote server data operation 404 transfers processing to save remote login data operation 405.

Save remote login data operation 405 retrieves the configuration of remote access users from system database 203. This information includes users on other database servers that can gain access to database server 202 from one of the remote servers identified in operation 404. The configuration of remote access users is written to human readable database management system recovery output file 225. For a Sybase SQL server, the command used to perform operation 405 is select * from sysremotelogins. Save remote login data operation 405 transfers processing to save system login data operation 406.

Save system login data operation 406 retrieves from system database 203 the user account names and passwords as well as other user configuration parameters for the users that have access to the database server 202 itself. The user account names, passwords and other user configuration parameters are written to human readable database management system recovery output file 225. For a Sybase SQL server, the command used to perform operation 405 is select * from syslogins. Save system login data operation 406 transfers processing to save server characterization data operation 407.

Save server characterization data operation 407 retrieves high level data that specifies the overall configuration of database server 202 from system database 203. The high level overall configuration data includes information such as the number of users who can connect to database server 202, stack sizes, caches, etc. The high level overall configuration data are written to human readable database management system recovery output file 225. For a Sybase SQL server, the stored procedure used to perform operation 405 is sp_configure. Save server characterization data operation 407 transfers processing to save virtual device data operation 408.

Save virtual device data operation 408 retrieves information that characterizes the virtual devices utilized by database server 202 from system database 203. Some of this information is the same as that processed in operation 402, but the information is formatted differently. In addition, the virtual device number is retrieved. The information retrieved in operation 408 is not saved by a normal system back-up. The information characterizing the virtual devices is written to human readable database management system recovery output file 225. For a Sybase SQL server, the stored procedure used to perform operation 405 is sp_helpdevice. Save virtual device data operation 408 transfers processing to save database characterization data operation 409.

Save database characterization data operation 409 retrieves information such as the size of the database, the name of the database creator, and the date the database was created for each database from system database 203. The retrieved information is written to human readable database management system recovery output file 225. For a Sybase SQL server, the stored procedure used to perform operation 409 is sp_helpdb. Save database characterization data operation 409 transfers processing to save cache configuration operation 410.

Save cache configuration operation 410 retrieves data characterizing the cache or caches utilized by database server 202 from system database 203. The cache characterization data are written to human readable database management system recovery output file 225. For a Sybase SQL server, the stored procedure used to perform operation 410 is sp_helpcache. Save cache configuration operation 410 transfers processing to save mirror device status data operation 411.

Save mirror device status data operation 411 is optional and is used only for database server 202 that maintains a mirror device for each storage device used by database server 202. This mirroring is separate and distinct from any mirroring that may be performed by the computer operating system.

Save mirror device status data operation 411 retrieves a server device name, physical device name, mirror device name and a status for each server storage device from system database 203. The server device name, physical device name, mirror device name and a status for each server storage device are written to human readable database management system recovery output file 225. Save mirror device data operation 411 transfers processing to save device space operation 412.

For a Sybase SQL server, there is not a stored procedure that can be used to perform operation 411. Consequently, it is necessary to write a script that creates a stored procedure that performs operation 411 and to load the stored procedure into an appropriate location such as the database sybsystem-procs. Table 1 is a listing that can used in creating such a stored procedure.

TABLE 1

© 1997, Sun Micrcsystems, All Rights Reserved
create procedure p__mirror as
select getdate()
select @@servername
select db__name()
select "logical"=substring(name,1,10),
    "physical"=substring(phyname,1,20),
    "mirror"=substring(mirrorname,1,20), status
    from master..sysdevices where cntrltype=0
go Save device space operation 412 determines from master database 203 the total, used and free storage space for all server storage devices of database server 202. For each server device, the server device name, the total storage space in Megabytes, the used storage space in Megabytes, and the free storage space in Megabytes are written to human readable database management system recovery output file 225. Save device space operation 412 transfers processing to save server map operation 413.

For a Sybase SQL server, there is not a stored procedure that can be used to perform operation 412. Consequently, it is necessary to write a script that creates a stored procedure that performs operation 412 and to load the stored procedure into an appropriate location such as the database sybsystem-procs. Table 2 is a listing that can be used in creating such a stored procedure.

TABLE 2

© 1997, Sun Microsystems, Inc., All Rights Reserved
create procedure p__devspace as
select device__name = sysdev.name,
total__Mb = (sysdev.high − sysdev.low + 1) / 512,
used__Mb = sum(sysuse.size)/512,
free__Mb =

TABLE 2-continued

```
        (sysdev.high - sysdev.low + 1)/512 -
        sum(sysuse.size)/512
        into #space_on_devices
        frorn sysdevices sysdev,
sysusages sysuse
    where sysdev.cntrltype = 0
        and
        sysuse.vstart between
            sysdev.low
            and
            sysdev.high
        group by sysdev.name
/* now for any devices that have been
initialized but not yet in use by any
databases... */
insert #space_on_devices
select sysdev.name,
total_Mb = (sysdev.high - sysdev.low + 1) / 512,
used_Mb = 0,
free_Mb = (sysdev.high - sysdev.low + 1) / 512
    from sysdevices sysdev,
sysusages sysuse
    where sysdev.cntrltype = 0 and not exists
        (select * from sysusages sysuse2
        where sysuse2.vstart between sysdev.low
        and sysdev.high)
/* now output the total results */
select distinct * from #space_on_devices
order by device_name
compute sum(total_Mb),
sum(used_Mb), sum(free_Mb)
return
go
```

Save server map operation 413 generates a list, using information from system database 203, that includes the name of each server device that stores at least one database segment, the total space on the server device taken by the database segments, the databases segments on the server device, the segment number of each database segment, and the size of each database segment. Operation 413 generates information only for server devices that include at least one database segment. Server devices that have been created but not yet assigned to any database do not appear. The list generated by operation 413 in combination with the information from operations 411 and 412 is sufficient to generate an entire server map. Operation 413 writes the list to human readable database management system recovery output file 225. Save server map operation 413 completes dump server configuration operation 303 and so processing transfers to create database list operation 304.

For a Sybase SQL server, there is not a stored procedure that can be used to perform operation 413. Consequently, it is necessary to write a script that creates a stored procedure that performs operation 413 and to load the stored procedure into an appropriate location such as the database sybsystem-procs. Table 3 is a listing that can be used in creating such a stored procedure.

TABLE 3

```
© 1997, Sun Microsystems, Inc., All Rights Reserved
# we first select the devices and for each device
# the relevant entries from sysusauges
# we select this data into temporary table #smap
create procedure p_servermap as
select device_name =substring( sysdev.name,1,11),
database_name=substring(sysdb.name,1,20),
seg#=substring(convert(char(4),sysuse.segmap)
    ,1,4),
size_Mb =
```

TABLE 3-continued

```
substring(convert(char(7),sysuse.size/512),1,7)
into #smap
frotn sysdevices sysdev,
sysdatabases sysdb,
sysusages sysuse
where
    sysdev.cntrltype = 0
and
    sysuse.vstart
    between
        sysdev.low
        and
        sysdev.high
    and
        sysuse.dbid = sysdb.dbid
# next we select from #smap to #smap2 summing up
# all the entries for each database, segment and
# segment number on each device. This means that
# multiple entries in sysusages for one segment of
# one database will be summed into one entry for
# the segment
select device_name,database_name,
seg#,space_per_seg=sum (convert(int,size_Mb))
into #smap2
from #smap
group by device_name,database_name,seg#
# we output the meaning of the segmap numbers. The
# segmap numbers 1 through 7 are the same for all
# databases. For segmap values greater than 7 you
# need to look at the data in syssegments for each
# database to see the segment name for each user
# defined segment. Note that for System10 the
# auditing database (sybsecurity) has a segment
# called auditsegment and the segmap value is 8 --
# since this segment is on the same server device
# as the system, default and logsegment the segmap
# value will be 15.
set nocount on
select "segmap values 1 through 7
seg# and segment name
1 -- system
2 -- default
3 -- default/system
4 -- log only
5 -- log/system
6 -- log/default
7 -- log/system/default
8 -- user defined
15 -- audit/log/sys/def
16 -- user defined"
set nocount off
# select the final output from #smap2 and this
# time compute the total space used by all
# database segments on each server device
select device_name,database_name,
seg#, space_per_seg
from #smap2
order by device_name,database_name,seg#
compute sum (space_per_seg)
by device_name
return
go
```

Figure 5:
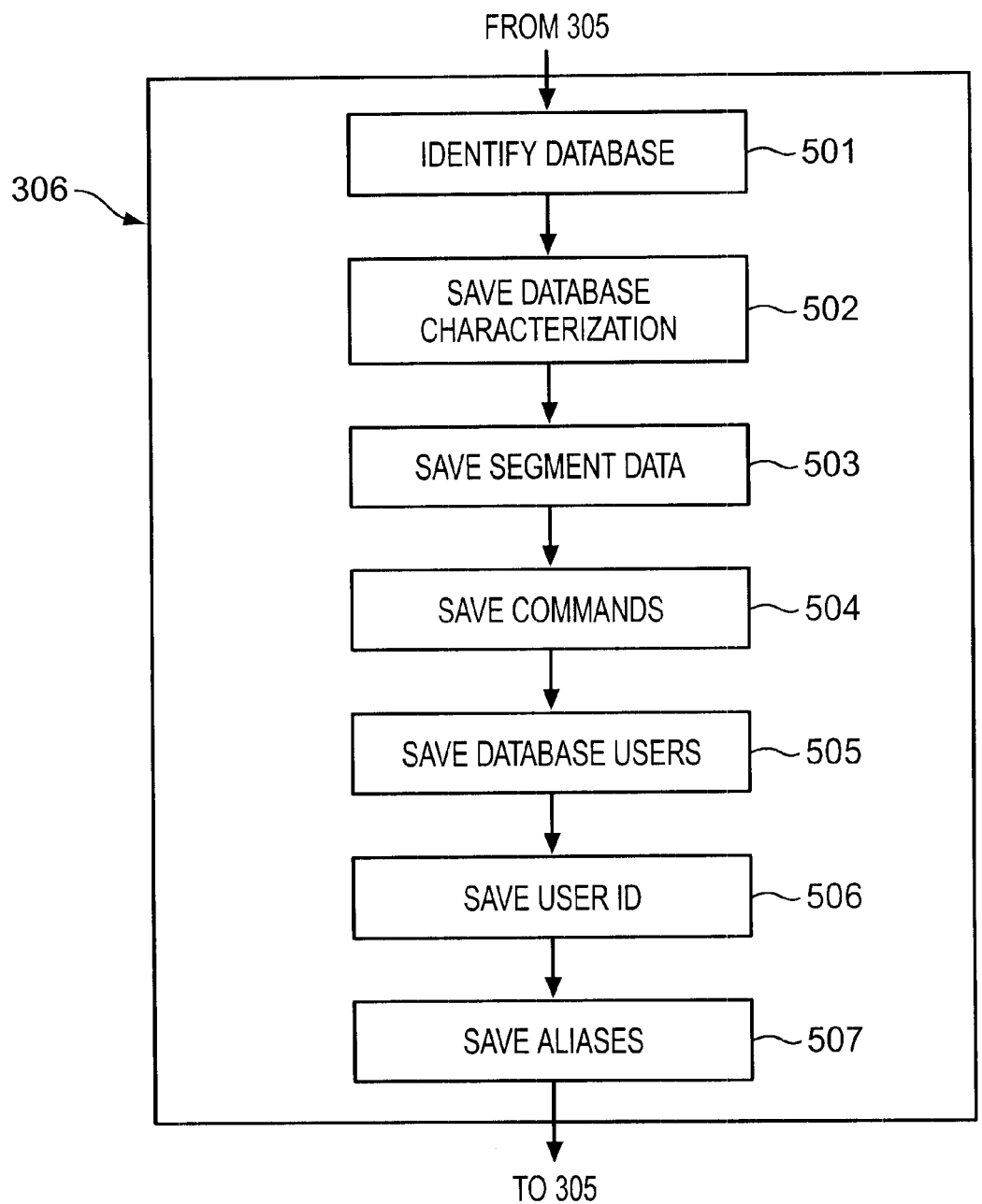
FIG. 5 is a flow diagram of a process for retrieving user database configuration data.

FIG. 5 is a more detailed process flow diagram of one embodiment of dump database configuration operation 306. Upon entering dump database configuration operation 306, identify database operation 501 writes a header including the name of the current user database to human readable database management system recovery output file 225. Operation 501 transfers processing to save database characterization data operation 502.

Save database characterization data operation 502 is similar to save database characterization data operation 409, except operation 409 accessed information in system database 203 and operation 502 assesses information in the current user database. Operation 502 retrieves the size of the database, the name of the database creator, the date of creation of the database, the size of each of the database segments, and the physical devices on which the current user database is located are also retrieved. Operation 502 writes this information to human readable database management system recovery output file 225 and transfers processing to save segment data operation 503.

Save segment data operation 503 retrieves the names and the identification numbers of each of the segments that have been set up for the current database and writes this information to human readable database management system recovery output file 225. For a Sybase SQL server, the stored procedure used to perform operation 503 is sp_helpsegment from the current user database. Save segment data operation 503 transfers processing to save commands operation 504.

Save commands operation 504 dumps the commands needed to recreate the current user database on database server 202, and the commands necessary to update the system table that includes the system usage in the system database to setup all the segments on the proper devices once the current user database has been (re)created to human readable database management system recovery output file 225. Save commands operation 504 transfers processing to save database users operation 505.

For a Sybase SQL server, there is not a stored procedure that can be used to perform operation 504. Consequently, it is necessary to write a script that creates a stored procedure that performs operation 504 and to load the stored procedure into an appropriate location such as the database sybsystem-procs. Table 4 below is a listing that can be used in creating such a stored procedure.

TABLE 4

```
© 1997, Sun Microsystems, Inc., All rights reserved
create proc p_dbcreate @dbname varchar(40) as
# start by selecting or outputting the text of the
# create database command next, select all the
# rows from sysusages for the database and convert
# the number of logical pages in each row of
# sysusages to Mb -- one page is 2 Kb for SunOS
# servers and 1024 squared is 1 Mb
# the way we get the name of the server device for
# each row in sysusages is by noting that each
# server device has a low and high virtual page
# number and each row in sysusages has a
# virtual page number indicating the starting
# virtual page number of the fragment of disk
# space described by the row
select 'create database' + @dbname + 'on'
select
name + '=' + convert(char(4),(size*2048)/(1024*1024)) +
',' from master..sysusages u, master..sysdevices d
where u.vstart >= d.low
and u.vstart <= d.high
and d.cntrltype=0
and u.dbid=(select dbid from master..sysdatabases where
name=@dbname)
order by u.lstart
select 'for load'
# here we generate the commands necessary to update the
# system table sysusages to reflect the segments
# assigned to each server device
# in the original database. We do this by generating
# commands that will update the segmap value of the
# rows in sysusages on the target server to have the
# same values as the original server. We again use the
# virtual page start, low and high values to determine
# which rows in sysusages should get which segmap
# value.
select 'update sysusaqes set segmap=' +
convert(char(4),u.segmap) +' where
dbid=(select dbid from master..sysdatabases where
```

TABLE 4-continued

```
name="'
+ @dbname +
'") and lstart >= ' + convert(char(9),lstart) +
'and lstart < ' +
convert (char(9),lstart+size) from
master..sysusages u, master..sysdevices d
where u.vstart >= d.low
and u.vstart <= d.high
and d.cntrltype=0
# throughout this script we must only affect changes to
# those rows of sysusages that belong to the database
# in question -- here the # rows of sysusages that are
# affected are limited to those that have the dbid of
# the database that is being (re)created --dbid =
# (select dbid ... name = database in question) is
# selected because the dbid may not be the same on the
# target server as on the primary even though the
# databases will have the same name
and u.dbid=(select dbid from master..sysdatabases where
name=@dbname)
go
```

The commands that are generated in Table 4 use the for load option of the create database command. This is much faster than the create database command alone because database server 202 assumes (in fact requires) the database is immediately loaded from a database dump after the database is created with the for load option. Using the for load option prevents database server 202 from initializing all the data pages as it would with the normal create database command. This can save a great deal of time for large databases.

The script in Table 4 also outputs the Transact-SQL commands necessary to update the system table sysusages in the master database to setup all the segments on the proper devices once each database has been (re)created. For a full discussion of sysusages and what it does, see Brian Hitcock, *SYBASE Administrators's Handbook*, Prentice Hall, Chapter 11, 1996.

Save database users operation 505 retrieves the access information of each user of the current database. Normally there are two levels of security in a database system, the server level and the database level. Only being able to access the server is not enough. One has to be granted specific access to an individual database to get to the data. Therefore, operation 505 retrieves the identification of the users that have been granted access to the current database and writes the information to human readable database management system recovery output file 225. Save database users operation 505 transfers processing to save user ID operation 506. For a Sybase SQL server, the stored procedure sp_helpuser is used to perform operation 505.

Save user ID operation 506 retrieves the actual identification numbers of the users that have access to the current database. Once the structure of a destroyed database system is reestablished, the ID information is use to recreate the permission so that a user of the destroyed database system can access the same options on the new database system. Operation 506 writes the identification numbers to human readable database management system recovery output file 225. For a Sybase SQL server, the command select from * sysusers is used to perform operation 506. Upon completion operation 506 transfers processing to save aliases operation 507.

In save aliases operation 507, the actual ID numbers for the alias users are retrieved from the current database and written to human readable database management system recovery output file 225. This information is important because when moving to a new computer these ID numbers can change depending on the order these objects are created. For a Sybase SQL server, the ID numbers are obtained by the command select from * sysalternates. Operation 507 completes dump database configuration operation 306.

In the above description some embodiments of this invention are disclosed. These embodiments are illustrative only and are not intended to limit the scope of the invention. Particularly, even though a Sybase SQL server is used for the discussion, the spirit of the present invention is in no way limited to a Sybase SQL server system. In view of this disclosure, those skilled in the art will be able to use the principle of the present invention to create human-readable recovery output files for a wide variety of computer based applications, particularly for a wide variety of database management systems.

---

APPENDIX A
A BOURNE SHELL SCRIPT TO DUMP THE CONFIGURATION OF A
SYBASE SQL SERVER TO A HUMAN-READABLE OUTPUT FILE

```
© 1997, Sun Microsystems, Inc., All rights reserved
#!/bin/sh

# Bourne shell script to dump the configuration of the
# specified SQL Server

if [ $#-lt 1 ]
then
echo $0: invalid format: $# argv parameters provided,
at least 1 required
echo $0: required format: $0 '<SERVER>'
exit 1
fi

# setup parameters

# ***** you must edit the path for SYBASE and PWD
# environment variables
SYBASE=/export/home/sybase
SERVER=$1
PWD=`cat /export/home/sybase/. kparm`
# ***** you must edit the path for the dumpdir file
# directory
dumpdir=/export/home/dbdump
outfile=${dumpdir}/${SERVER}_config_dump.out
outfile2=${dumpdir}/${SERVER}_config_dump.out2
tempfile=${dumpdir}/${SERVER}_config_dump.temp1

chmod 700 $outfile
chmod 700 $outfile2

# begin dumping server configuration

echo "dump server config:${SERVER}: started at 'date'."
> $outfile
echo "dump server config:${SERVER}: started at 'date'."
> $outfile2
echo " " >> $outfile
echo " " >> $outfile2

# dump overall server configuration

$SYBASE/bin/isql -Usa -S${SERVER} -P${PWD} -
I$SYBASE/interfaces -e > ${outfile} << finish_sql1
use master
go
select * from sysusages
go
select * from sysdevices
go
select * from sysdatabases
go
select * from sysservers
go
select * from sysremotelogins
go
select * from syslogins
go
sp_configure
go
sp_helpdevice
go
```

APPENDIX A
A BOURNE SHELL SCRIPT TO DUMP THE CONFIGURATION OF A SYBASE SQL SERVER TO A HUMAN-READABLE OUTPUT FILE

```
sp_helpdb
go
sp_helpcache
go
sp_cacheconfig
go
sybsystemprocs..p_mirror
go
sybsystemprocs..p_devspace
go
sybsystemprocs..p_servermap
go
finish_sql1

# setup list of databases in server

$SYBASE/bin/isq1 -Usa -S${SERVER} -P${PWD} -
I$SYBASE/interfaces -e > ${tempfile} << finish_sql2
use master
go
select name from sysdatabases order by name
go
finish_sql2

# output list of databases

echo " " >> $outfile
echo "@@@@@@@@@@@@@@@@@@@@@@@@" >> $outfile
echo "all databases in server $SERVER...." >> $outfile
echo "@@@@@@@@@@@@@@@@@@@@@@@@" >> $outfile
echo " " >> $outfile

cat ${tempfile} >> $outfile
echo " " >> $outfile

# cut out the first 4 and last 2 lines of the listing
# of all databases in this server
# see the dump_db_create script discussion for details
# of the following part of the script

num_lines=`wc -1 ${tempfile} | cut -c1-9`
last_line=`expr $num_lines - 4`
first_line=`expr $last_line - 2`
databases_list=`tail -$last_line ${tempfile} | head -
$first_line`
rm -f ${tempfile}

# now we dump configuration information for the
# database

for database_name in $databases_list
do

echo "@@@@@@@@@@@@@@@@@@@@@@@@@@@@@@@@@@@@@@@@" >>
$outfile
echo "dumping configuration information for database
$database_name in $SERVER" >> $outfile
echo "@@@@@@@@@@@@@@@@@@@@@@@@@@@@@@@@@@@@@@@@" >>
$outfile
echo " " >> $outfile

$SYBASE/bin/isq1 -Usa -S${SERVER} -P${PWD} -
I$SYBASE/interfaces -e >> ${outfile} << finish_sql2
use $database_name
go
sp_helpdb $database_name
go
sp_helpsegment
go
sybsystemprocs..p_dbcreate $database_name
go
sp_helpuser
go
select * from sysusers
go
```

-continued

APPENDIX A
A BOURNE SHELL SCRIPT TO DUMP THE CONFIGURATION OF A
SYBASE SQL SERVER TO A HUMAN-READABLE OUTPUT FILE

```
select * from sysalternates
go
finish_sql2

# the done is for the loop for each database

done

# append full output file to summary output file
# email output

echo " " >> $outfile
echo "dump server config:${SERVER}: exiting at 'date'."
>> $outfile
echo " " >> $outfile
echo "dump server config:${SERVER}: exiting at 'date'."
>> $outfile2
echo " " >> $outfile2
echo " " >> $outfile2
echo
"*********************************************************
" >> $outfile2
cat $outfile >> $outfile2
# ***** you must edit the recipient of the email
/usr/ucb/mail -s "${SERVER}: dump server config cronjob
complete" psychoDBA@dbahost < $outfile2
exit
```

I claims:

1. A database configuration data backup computer process comprising:
retrieving system configuration data from each of one or more system databases in a database management system;
storing a copy of each of said system databases on to a back-up medium; and
storing the system configuration data corresponding to said copy of each system database in a human-readable computer file, said system configuration data, which includes a map of storage space used by said data base management system, being provided for reconstructing said system databases from said back-up medium.

2. A database configuration data backup computer process as in claim 1 further comprising:
retrieving user configuration data from each user database in said database management system;
storing a copy of each of said user databases on to said back-up medium and
storing the user configuration data corresponding to said copy of each user database in said human-readable computer file.

3. A database configuration data backup computer process as in claim 1 further comprising:
transmitting said human-readable computer file to a specified location.

4. A process in claim 3, wherein said transmitting said human-readable computer files comprises transmitting said human-readable computer file via electronic mail to said specified location.

5. A database configuration data backup computer process as in claim 2 further comprising:
transmitting said human-readable computer file to a specified location.

6. A process in claim 5, wherein said transmitting said human-readable computer files comprises transmitting said human-readable computer file via electronic mail to said specified location.

7. A process as in claim 1 further comprising:
performing a back-up of a computer that executes said database management system to save said human-readable computer file.

8. A process as in claim 2 further comprising:
performing a back-up of a computer that executes said database management system to save said human-readable computer file.

9. A process according to claim 1, wherein said retrieving system configuration data further comprises retrieving system usage data.

10. A process according to claim 1, wherein said retrieving system configuration data further comprises retrieving logical device characterization data.

11. A process according to claim 1, wherein said retrieving system configuration data comprises retrieving database identification data.

12. A process according to claim 1, wherein said retrieving system configuration data comprises retrieving remote server data.

13. A process according to claim 1, wherein said retrieving system configuration data comprises retrieving remote login data.

14. A process according to claim 1, wherein said retrieving system configuration data comprises retrieving system login data.

15. A process according to claim 1, wherein said retrieving system configuration data comprises retrieving server characterization data.

16. A process according to claim 1, wherein said retrieving system configuration data comprises retrieving virtual device data.

17. A process according to claim 1, wherein said retrieving system configuration data comprises retrieving database characterization data.

18. A process according to claim 1, wherein said retrieving system configuration data comprises retrieving cache configuration.

19. A process according to claim 1, wherein said retrieving system configuration data comprises retrieving mirror status configuration.

20. A process according to claim 1, wherein said retrieving system configuration data comprises retrieving device space configuration data.

21. A process according to claim 1, wherein said retrieving system configuration data comprises retrieving server map data.

22. A process according to claim 2, wherein said retrieving user configuration data further comprises creating script for recreating said database.

23. A process according to claim 2, wherein said retrieving user configuration comprises retrieving user database configuration data.

24. A process according to claim 2, wherein said retrieving user configuration comprises retrieving segmentation data.

25. A process according to claim 2, wherein said retrieving user configuration comprises saving commands that are used for re-creating the database.

26. A process according to claim 2, wherein said retrieving user configuration comprises retrieving access information of each user database.

27. A process according to claim 2, wherein said retrieving user configuration comprises retrieving actual user ID numbers.

28. A process according to claim 2, wherein said retrieving user configuration comprises retrieving ID numbers for the alias users.

29. A computer readable storage medium containing a computer software program, said program being capable of performing functions comprising:

retrieving system configuration data from each of one or more system databases in a database management system;

storing a copy of each of said system databases on to a back-up medium and storing the system configuration data corresponding to said copy of each system database in a human-readable computer file, said system configuration data, which includes a map of the storage space used by said database management system, being provided to allow reconstruction of said system databases from said back-up medium.

30. A computer readable storage medium of claim 29, wherein said functions of said program further comprising:

retrieving user configuration data from each user database in said database management system;

storing a copy of each of said user databases on to said back-up medium: and storing the user configuration data corresponding to said copy of each user database in said human-readable computer file.

* * * * *

UNITED STATES PATENT AND TRADEMARK OFFICE
CERTIFICATE OF CORRECTION

PATENT NO. : 6,487,558 B1
DATED : November 26, 2002
INVENTOR(S) : Brian R. Hitchcock It is certified that error appears in the above-identified patent and that said Letters Patent is hereby corrected as shown below:

Column 20,
Line 25, delete "medium:" and insert -- medium; --

Signed and Sealed this

Eighth Day of April, 2003

JAMES E. ROGAN
*Director of the United States Patent and Trademark Office*